United States Patent [19]
Bloch

[11] Patent Number: 5,190,798
[45] Date of Patent: Mar. 2, 1993

[54] PAPER-PLASTIC FILM, FIBERGLASS-REINFORCED SEALING TAPE

[76] Inventor: Gilbert Bloch, 3149 S. Malo Ct., Palm Beach Gardens, Fla. 33410

[21] Appl. No.: 818,543

[22] Filed: Jan. 9, 1992

[51] Int. Cl.$^5$ ............................................. B32B 3/00
[52] U.S. Cl. ..................................... 428/40; 428/42; 428/343; 428/354; 428/355; 428/507; 428/511; 428/512; 428/914
[58] Field of Search .................. 428/357, 40, 42, 343, 428/354, 355, 507, 511, 512, 908, 914; 156/304

[56] References Cited

U.S. PATENT DOCUMENTS 4,041,202  8/1977  Williams .............................. 428/138
4,351,877  9/1982  Williams ................................ 428/42
4,557,971 12/1985  Williams ................................ 428/40

Primary Examiner—Patrick J. Ryan
Assistant Examiner—Newton O. Edwards
Attorney, Agent, or Firm—Michael Ebert

[57] ABSTRACT

A paper-plastic film, fiberglass-reinforced sealing tape for sealing a carton, a package, or any other article fabricated of recyclable material. The tape includes a paper inner ply whose exposed face is pregummed, whereby the tape is adherable to the article to be sealed, and a synthetic plastic film outer ply laminated by a water-based adhesive to the inner ply. Sandwiched between the inner and outer plies is a longitudinal array of fiberglass strands serving to reinforce the tape. When an article sealed by the tape is to be recycled, then the outer plastic ply, which cannot be recycled, is stripped from the tape.

8 Claims, 1 Drawing Sheet

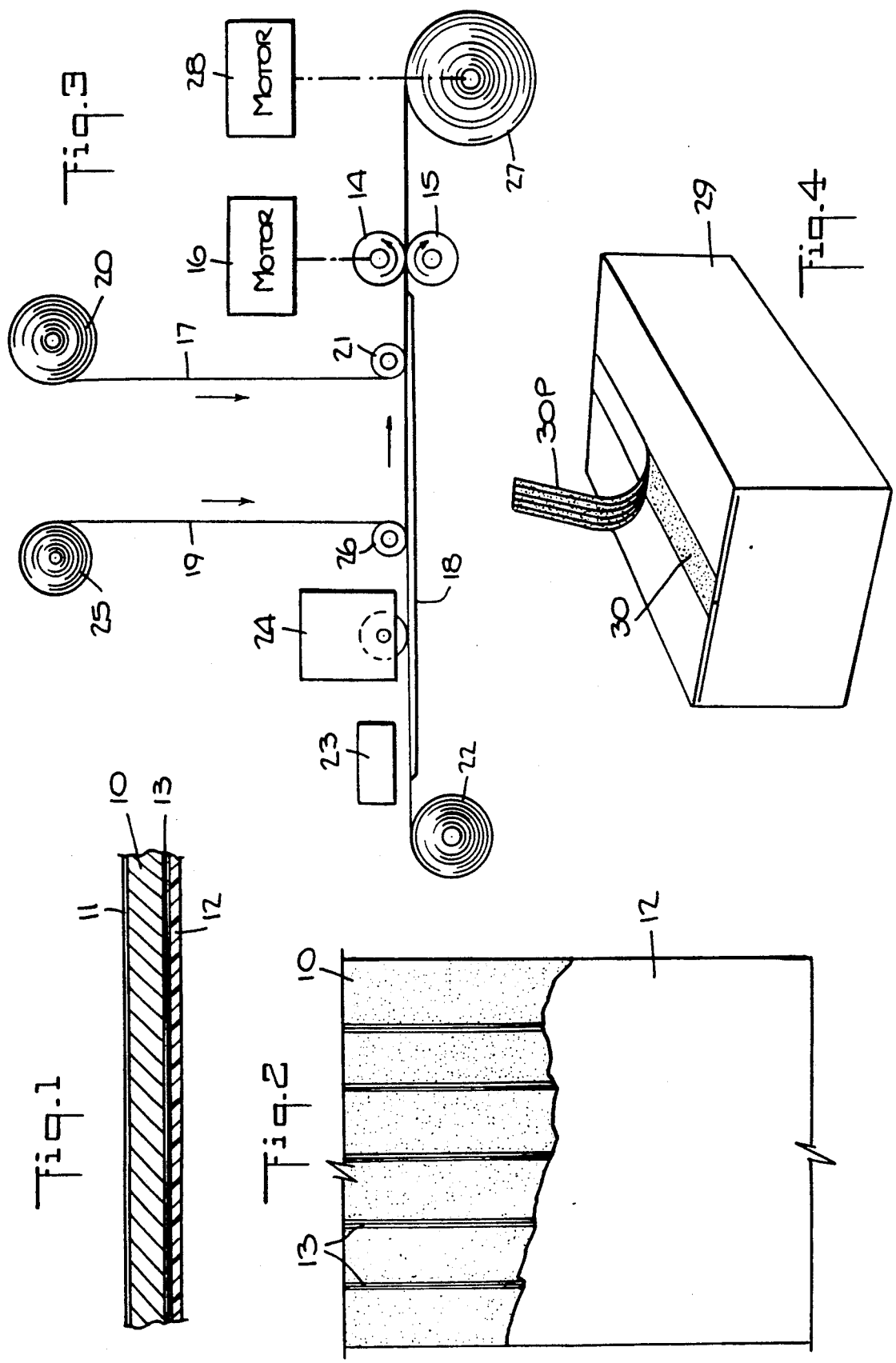

PAPER-PLASTIC FILM, FIBERGLASS-REINFORCED SEALING TAPE

BACKGROUND OF INVENTION

1. Field of Invention

This invention relates generally to tapes for sealing cartons, packages and other articles, and more particularly to a fiberglass-reinforced sealing tape for this purpose having a paper inner ply and a synthetic plastic film outer ply laminated thereto by a water-based adhesive, the outer ply being strippable from the inner ply so that the article can be recycled.

2. Status of Prior Art

Because of rising environmental concerns, in recent years stress has been placed on the use of products fabricated of materials which can be recycled. Thus a strong preference now exists for bags, cartons and other articles made of paper, for these articles can then be recycled. This is not true of most products made entirely or in part of synthetic plastic materials.

Thus a corrugated board carton lends itself to recycling, but not if the carton has a synthetic plastic film liner to render it water-resistant. A similar problem is encountered when use is made of a standard fiberglass-reinforced paper tape to seal the carton. This tape has its inner and outer paper plies laminated together by a hot melt polymeric adhesive, the nature of which is such that it is not compatible with recycling operations.

In recycling, the carton is shredded in a beater and a slurry is then formed of the shredded material for further processing. While metal staples, glass fibers and other foreign objects may readily be filtered out of the slurry, a hot melt polymeric adhesive cannot, and this contaminates the slurry. Hence a standard, fiberglass-reinforced paper tape, when used to seal an otherwise recyclable article, usually renders it non-recyclable, unless the tape is first stripped off. But to do so is a time consuming and difficult operation, for the gummed face of the tape is securely joined to the article and should one seek to strip this tape from the article, a residue of hot melt adhesive remains thereon and renders it unsuitable for recycling.

In a standard fiberglass-reinforced sealing tape, two plies of Kraft paper, laminated together by a hot melt adhesive, have sandwiched therebetween two superposed arrays of fiberglass strands. In one array, parallel strands of fiberglass run longitudinally alone the tape, while in the other, the parallel strands run in the cross direction at an angle to the longitudinal strands. The resultant thickness of the tape is such that when it is wound into a roll having a 7 inch diameter for use in a conventional manually or electrically-operated tape dispenser, the tape capacity of the roll is relatively low. Clearly, this thinner the tape, the greater is the yardage of tape contained in a 7 inch diameter roll. But with a relatively thick laminated paper tape having two arrays of fiberglass sandwiched between its plies, the limited yardage in a roll of this tape gives rise to practical problems.

Thus when the tape dispenser is in uninterrupted use in sealing operations for mass-produced cartons, the tape roll is quickly exhausted, thereby making it necessary to put a fresh roll in the dispenser at frequent intervals. And because the hot melt adhesive in the tape tends to build up on the cutting blade of the dispenser, it is necessary from time to time to shut down the dispenser to clean this blade. And because each 7 inch diameter tape roll contains a limited yardage of tape, the storage space required for an adequate stock of such tape is high.

Moreover, when the paper/paper sealing tape is used to seal and hold together a carton that in the course of shipment becomes exposed to rain or snow, the paper tape will absorb water which may leak into the carton. And the wet tape may be so weakened as to cause it to give way, with a resultant collapse of the carton.

But quite apart from the drawbacks of a standard reinforced paper/paper tape in the context of tape dispensers are the problems encountered when manufacturing a tape of this type in a conventional laminator. In manufacturing, two Kraft paper webs are continuously fed into the laminator, the surface of one web having first applied thereto a coating of hot melt adhesive. Also continuously fed into the laminator are the longitudinal and cross arrays of fiberglass strands. The need to feed separate arrays of fiberglass strands into the laminator dictates a relatively slow operating speed, with a resultant low tape production rate per hour.

Also, the hot melt adhesive must be maintained in a heated state while the laminator is in operation. And because this hot, flowable adhesive tends to drip over the operating mechanism of the laminator, it becomes necessary from time to time to shut down the laminator and use solvents to clean it. The use of volatile solvents may lead to troublesome environmental problems.

SUMMARY OF INVENTION

In view of the foregoing, the main object of this invention is to provide a paper-plastic film reinforced-fiberglass tape of high strength in which the inner and outer plies of the tape are laminated together by a water-based adhesive.

A significant advantage of a tape in accordance with the invention is that it is relatively thin and therefore when wound into a supply roll for use in a tape dispenser, the roll then has a large tape capacity. Another advantage is that the metal cutting blade of the dispenser remains clean, because the water-based adhesive does not tend to build up on the blade in the course of repeated cutting actions.

More particularly, an object of this invention is to provide a tape of the above type in which the inner ply is paper and the outer ply is of a synthetic plastic film material of much higher strength than the paper; hence even though it is laminated to the paper ply, it can readily be stripped therefrom after the sealing tape ha been adhered to a carton or other article to be sealed. Thus when used to seal an article fabricated of a recyclable material, the outer plastic film ply of the tape, which is not recyclable, may then be stripped off.

Yet another object of the invention is to provide a tape of the above type which has awater-resistant outer ply that maintains its strength even when exposed to heavy rain or snow.

Also an object of this invention is to provide a tape of the above type which lends itself to manufacture by a laminator system operating at high speed to produce tape at a high production rate.

Briefly stated, these objects are attained in a paper-plastic film, fiberglass-reinforced sealing tape for sealing a carton, a package, or any other article fabricated of recyclable material. The tape includes a paper inner ply whose exposed face is pregummed, whereby the tape is adherable to the article to be sealed, and a synthetic plastic film outer ply laminated by a water-based adhesive to the inner ply. Sandwiched between the inner and outer plies is a longitudinal array of fiberglass strands serving to reinforce the tape. When an article sealed by the tape is to be recycled, then the outer plastic ply, which cannot be recycled, is stripped from the tape.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a cross section taken through a fiberglass-reinforced sealing tape in accordance with the invention, the thickness of whose plies and fiberglass strands is grossly exaggerated;

FIG. 2 is a plan view of the tape whose outer ply is cut away to expose the fiberglass strands and the inner ply;

FIG. 3 schematically shows a laminator for manufacturing the tape; and

FIG. 4 shows a carton sealed with the tape.

DESCRIPTION OF INVENTION

The Tape

Referring now to FIGS. 1 and 2, there is shown a fiberglass-reinforced tape in accordance with the invention, the tape including an inner ply 10 formed of Kraft paper whose exposed surface has a layer 11 of water-activatable gum or other adhesive. Thus the tape, when its pregummed face is moistened, can be applied to a carton of a package or other article to be sealed. Pregummed paper tapes are commonplace and commercially available. Pregummed paper may be used for inner ply 10.

Laminated by a water-based adhesive to the inner paper ply 10 is an outer ply 12 formed of a thin, synthetic plastic film material of a high strength, such as polyethylene, polypropylene or polyvinyl chloride, or a polyester such as Mylar. The preferred thickness of the film is one mil. The pregummed Kraft paper ply 10 is preferably no more than 3 mils in thickness, but its bond fiber strength is relatively low.

However, when paper ply 10 is laminated to a high-strength plastic film, the laminate strength is then far greater than a paper/paper tape, particularly if the film is biaxially or monoaxially oriented.

The water-based adhesive is a polyacrylate copolymer, or any other water-based adhesive having similar bonding properties and an affinity both for the paper ply and the plastic film ply. Paper is constituted by a sheet of matted cellulosic fibers held together by mechanical intertwining and by a bonding agent. The water based adhesive is applied at 2 to 3 pounds per ream as compared to the typical 16 pounds per seam when a hot melt adhesive is used for laminating a paper-paper ply tape. The water-based adhesive does not migrate through the relatively thick Kraft paper ply and does not reach its pre-gummed outer surface but effects a bond at the interface of the surface over the Kraft paper ply and the plastic film ply.

Sandwiched between inner and outer plies 10 and 12 is a longitudinal array of parallel fiberglass strands 13. Each strand 13 is composed of a small cluster of glass fibers, each preferably having a denier of 0.1. In practice, the two fibers are sufficient to form a cluster, although a greater number may be used to enhance the strength of the tape.

Thus the thickness of the fiberglass-reinforced paper-plastic laminate tape, which includes only one array of glass fibers, is much less than that of a standard paper/paper tape having two superposed arrays of glass fibers. As a consequence, a greater yardage per 7 inch diameter dispenser supply roll is obtained with a tape in accordance with the invention than with a standard paper/paper tape. And because the water-based adhesive will not foul the cutting blade of the dispenser, there is no need to clean this blade from time to time as would be necessary with tapes having a hot melt adhesive incorporated therein.

The Laminator System

To manufacture a tape in accordance with the invention, use is made for this purpose of the laminator system shown in FIG. 3. This system includes a combining station having a pair of cooperating pressure rolls 14 and 15 driven at high speed by a motor 16. The nip between these rolls is related to the thickness of the webs to be laminated and is adjusted to provide the desired degree of laminating pressure to ensure secure bonding of the webs.

Fed concurrently into this nip are a web 17 of Kraft paper whose exposed face is pregummed to form the inner ply of the sealing tape, a web 18 of synthetic plastic film material to form the outer ply, and parallel strands 19 of fiberglass to provide reinforcement for the tape.

Web 17 is drawn from a paper supply reel 20 supported at an elevated position, the paper web 17 being drawn downwardly from the reel in a vertical path and being guided by an idler roll 21 into a horizontal path leading into the nip of combining rolls 14 and 15. Film web 18 is drawn from a film supply reel 22 which is placed at a position to feed the film web in a horizontal path toward the nip of the combining rolls. Reel 22 is placed well in advance of the combining rolls to expose a stretch of film web before it enters the combining rolls.

Along this stretch is an ionization bar 23 which functions to ionize the inner surface of film web 18 to increase the dynes on the surface preparatory to the application of a water-based adhesive thereto by an adhesive applicator 24. This applicator includes a coating roll that engages the film surface and acts to fully coat this surface with a water-based adhesive.

The parallel strands 19 of fiberglass are drawn from an elevated bank of reels 25 on a common axle, the strands being drawn downwardly in a vertical path and fed under a corresponding bank of idler rolls 26 which guide the strands which now lie on the inner surface of the film web in a horizontal path toward the combining station. These strands, before they enter the combining station, are wetted by the water-based adhesive on the advancing film web and stick to this web.

Hence when the adhesive-coated film web 18, the longitudinal array 19 of fiberglass strands lying on the film web and the paper web 17 enter the combining station at ambient temperature, they are subjected to pressure by pressure rolls 14 and 15, lamination being effected by this action. The resultant laminated tape with the array of fiberglass strands sandwiched between the plies, after advancing in a path to permit drying of the adhesive, is then wound on an output reel 27 driven by a motor 28. The operation of motors 16 and 28 are synchronized, for these motors serve to draw the webs and the fiberglass strands from the supply reels.

Since a typical sealing tape has a width of two or three inches, and the webs are much broader, the laminated web on output reel 27 is slit into tapes of the desired width by a conventional slitter having a bank of rotary slitter blades.

Application

FIG. 4 shows a corrugated board carton 29 having complementary flaps which are sealed by a fiberglass-reinforced paper film tape 30 in accordance with the invention.

The pregummed exposed face of the inner play adheres to the surface of the flaps, the tape bridging both flaps. The plastic film outer ply 30P is therefore now exposed, but because it is impermeable to water, it acts to render the tape water-resistant so that rain or snow will not weaken the tape or permit water to leak into the carton in the space between the edges of the held-together flaps.

But when the carton has served its purpose and is to be recycled, then it is necessary before doing so to remove the outer plastic film ply 30P, for this material cannot be recycled. Because the strength of the film and its integrity are far greater than that of the inner paper ply, it may readily be stripped off the tape, as shown in FIG. 4. The inner paper ply and most of the water-based adhesive remain on the carton.

In stripping off the outer plastic film ply, the fiberglass array, whose fibers have a greater affinity for the plastic film ply than for the porous paper ply usually comes off with the stripped outer film ply as well as the superficial inner surface layer of the paper ply. The fiber bond strength of the paper is relatively weak, and this bond is ruptured when stripping off the film ply. Thus what remains in the carton is the outer layer of the paper ply which is gummed to the article.

Any portion of the water-based adhesive which remains on the carton after stripping, does not interfere with the recycling process; hence as long as the plastic film ply is stripped off, this being a very simple procedure, the carton can be recycled.

It is to be understood that a sealing tape in accordance with the invention is not limited in its applications to sealing recyclable articles, for the exceptionally high strength of this tape and its suitability for conventional tape dispensers are such that the tape is usable wherever a strong and reliable seal is required.

While there has been shown and described a preferred embodiment of a fiberglass-reinforced sealing tape in accordance with the invention, it will be appreciated that many changes and modifications may be made therein without, however, departing from the essential spirit thereof.

I claim:

1. A strippable laminated sealing tape for sealing a carton or other article fabricated of recyclable paper material, said tape comprising:
   (a) a paper inner ply having a relatively low fiber bond strength, said paper inner ply having an exposed outer surface which is pre-gummed so that it is adherable to an article to be sealed, and having an inner surface;
   (b) a non-recyclable synthetic plastic film outer ply of high strength laminated to the inner surface of the inner ply by a water-based polyacrylate polymer adhesive, said outer ply rendering the tape water-resistant; and
   (c) a longitudinal array of fiberglass strands extending along the length of the tape and sandwiched between the plies and bonded thereto by said adhesive to reinforce the tape, said outer ply having an axial orientation that is normal to said longitudinal array, said strands having a greater affinity for the outer plastic film ply than for the inner paper ply to which the strands are bonded, whereby the plastic outer ply is strippable from the inner paper ply and when so stripped retains the strands bonded thereto to render the article, which retains substantially all of the inner paper ply, recyclable.

2. A tap as set forth in claim 1, wherein said paper ply is Kraft paper formed of cellulose fibers whose thickness is greater than 2 mils and has a relatively low fiber bond strength.

3. A tape as set forth in claim 1, wherein said film has a thickness of about one mil.

4. A tape as set forth in claim 1, wherein each strand is a cluster of at least two fibers.

5. A tape as set forth in claim 4, wherein said strands are in parallel relation, each fiber having a denier of about 0.1.

6. A tape as set forth in claim 1, wherein said film is made of polyethylene.

7. A tape as set forth in claim 1, wherein said film is made of oriented polypropylene.

8. A laminated sealing tape for sealing an article fabricated of recyclable paper material, the tape, when stripped from the article, removing therefrom that portion of the tape which is not recyclable, said tape comprising:
   (a) an inner paper ply having an exposed outer surface which is pre-gummed so that it is adherable to the article, and having an inner surface;
   (b) an outer, bi-axially oriented, synthetic plastic film ply superposed on said inner paper ply to engage the inner surface thereof;
   (c) a longitudinal array of fiberglass strands extending along the length of the tape interposed between the inner paper ply and the outer plastic ply; and
   (d) a water-based polyacrylate polymer adhesive bonding together said strands and said inner paper ply and said outer plastic ply to form a laminate, said strands having a greater affinity for the outer plastic ply than for the inner paper ply to which the strands are bonded, whereby when the tape is adhered to said article and the article is to be recycled, the outer plastic ply having the strands bonded thereto is stripped from the inner paper ply which is retained by the article and is recyclable.

* * * * *